United States Patent Office 2,987,961
Patented June 13, 1961

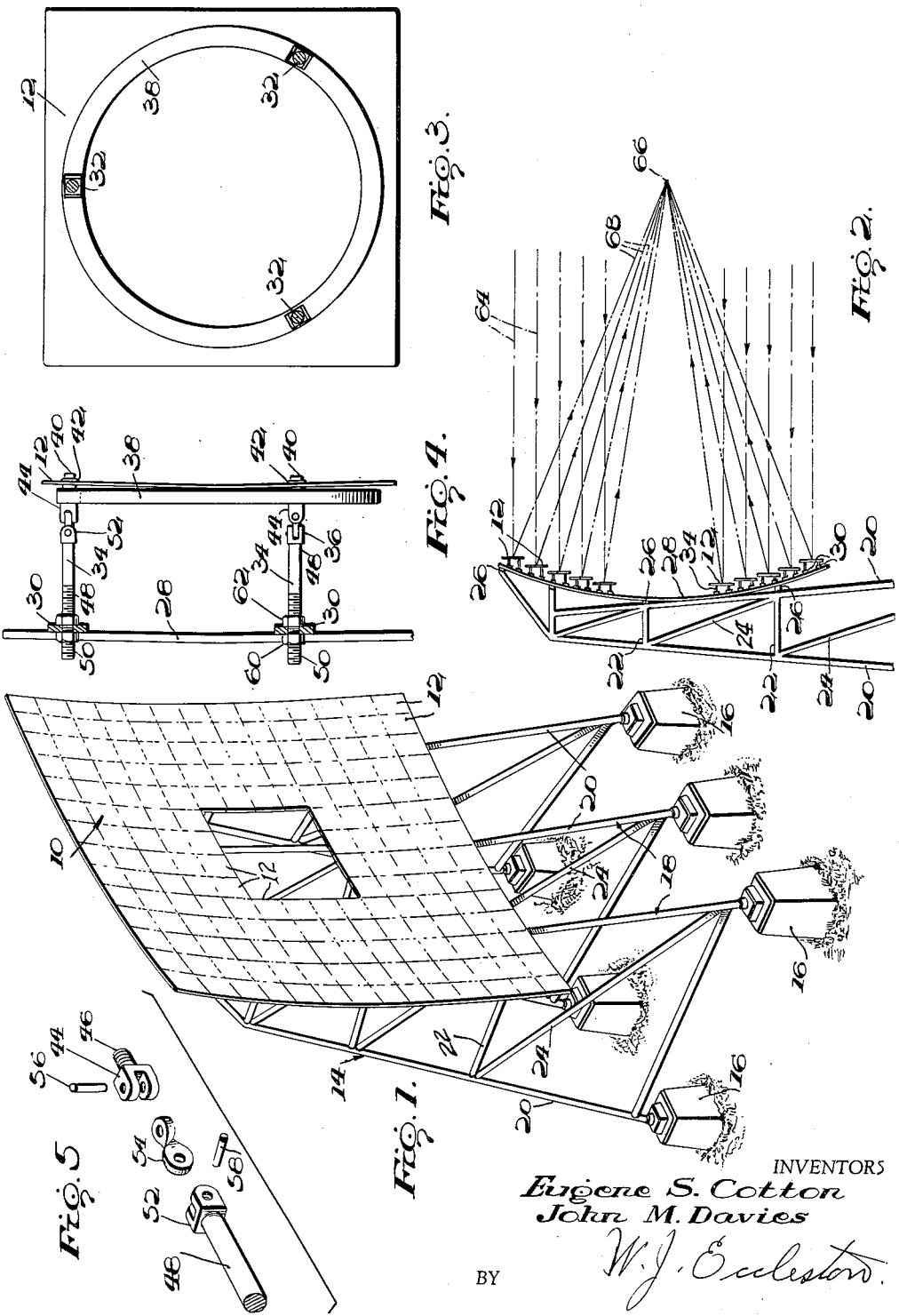

2,987,961
SOLAR FURNACE
Eugene S. Cotton, Natick, and John M. Davies, Wayland, Mass., assignors to the United States of America as represented by the Secretary of the Army
Filed Apr. 17, 1958, Ser. No. 729,218
5 Claims. (Cl. 88—84)
(Granted under Title 35, U.S. Code (1952), sec. 266)

The invention described herein, if patented, may be manufactured and used by or for the Government for governmental purposes, without the payment to us of any royalty thereon.

The present invention relates to solar furnaces and more particularly to an improved concentrator for focusing the sun's rays from a large area at a single predetermined focal point or field.

Because of the relatively large area from which the sun's rays must be collected and concentrated or focused to produce effective heating in a solar furnace and the difficulty and cost of producing a single mirror reflector or concentrator large enough to serve this purpose, attempts to simulate or approximate such single mirror concentrators have heretofore been made by arranging a plurality of relatively small mirrors of predetermined shape and curvature in a predetermined array. These multiple mirror concentrators have been made to approximate various single mirror reflectors, such as spherically concave, paraboloidal or ellipsoidal reflectors. To obtain this result, the individual mirrors in these multiple mirror concentrators must vary in contour or shape and in curvature. For example, if a multiple mirror concentrator is to approximate a spherically concave surface, the individual mirrors making up the same must take the form of a fragment of a spherically concave surface, or if the concentrator is to be paraboloidal which is the ideal shape because of the greater freedom of reflectors of that shape from aberration, the individual mirrors must take the form of a fragment of a parabola. In such paraboloidal concentrators, the individual mirrors differ from each other in contour and curvature, but it may be possible to use a plurality of groups of individual mirrors, the individual mirrors in a particular group being of substantially duplicate construction but the mirrors in each group differing from the mirrors in all the other groups. In either event, a relatively large number of individual mirrors differing from each other in contour and curvature are required to form the concentrator so that individual mirrors cannot be produced by mass production methods. Since each individual mirror must be accurately made to prevent undue aberration when the individual mirrors are assembled to form a concentrator, the cost of these mirrors is a large item of expense in the construction of a multiple mirror concentrator.

This disadvantage of known multiple mirror concentrators is avoided in the present invention by the use of spherically concave mirrors, the radius of curvature of which bear a predetermined relation to the radius of curvature of the frame on which these mirrors are mounted or to the radius of curvature of an imaginary spherical surface in which the centers of these mirrors are all adjusted to lie, as explained in detail hereinafter. By the use of the principle disclosed herein, it is possible to construct a multiple mirror concentrator comprising a plurality of individual mirrors of spherical shape which are substantially duplicate in construction, and yet obtain a high order of concentration and a low order of aberration, thus simplifying construction with an attendant reduction in cost but with no appreciable impairment of efficiency, as compared with a paraboloidal concentrator of the same dimensions.

Accordingly, an object of the invention is to provide a new and improved multiple mirror concentrator for a solar furnace or the like.

Another object of the invention is to provide a new and improved multiple mirror solar ray concentrator in which the individual mirrors may be of substantially duplicate construction.

A further object of the invention is to provide a new and improved solar ray concentrator in which astigmatic, spherical and other optical aberrations are reduced to a minimum.

A still further object of the invention is to provide a new and improved multiple mirror solar ray concentrator including a plurality of duplicate mirrors constructed and mounted to each focus parallel solar rays striking the same at a common focal point.

A more general object of the invention is to provide a new and improved multiple mirror solar ray concentrator which is relatively inexpensive to construct, easy to operate, efficient in operation and sufficiently sturdy to withstand the forces to which it may be subjected by high winds, snow, ice, and other results of inclement weather.

These and other objects, advantages, and capabilities of the invention will become apparent from the following description in which reference is had to the accompanying drawing wherein:

FIG. 1 is a more or less diagrammatic perspective view of the improved solar ray concentrator of the present invention in its entirety.

FIG. 2 is a diagrammatic side elevational view of the solar ray concentrator of the present invention indicating the manner in which parallel rays striking the individual mirrors are concentrated at a single predetermined focal point or field.

FIG. 3 is an elevational view on an enlarged scale of the back side of one of the individual mirrors in the concentrator of the present invention with portions of the supporting means for this mirror shown in section.

FIG. 4 is a side elevational view of one of the individual mirrors in the concentrator showing the manner in which this mirror is adjustably mounted upon the mirror supporting framework of the concentrator; and FIG. 5 is an exploded perspective view of a universal joint which may be used to mount the individual mirrors on the mirror supporting framework.

In a typical two-element solar furnace, a heliostat is provided which automatically tracks the sun and reflects solar rays in parallel beams upon a concentrator designed to focus or concentrate the parallel rays striking the same at a predetermined focal point or field which may be, for example, the interior of a test chamber. An attenuator may be provided in installations of this type to control the parallel rays striking the concentrator, and shutters may be provided on the test chamber to control the rays passing from the concentrator into the test chamber. The present invention is concerned with a concentrator particularly adapted for use in an installation of this type.

For the purpose of disclosing the principles of the invention, an embodiment thereof will now be described which includes a concentrator indicated in its entirety by the number 10 (FIG. 1) comprising a plurality of individual mirrors 12, each individually supported from a spherically concave grid-like framework which in turn is supported on an upright framework 14. This latter framework rests upon a foundation of concrete or the like pillars 16 sunk in the earth. Rigidly fixed to these pillars 16 is a series of vertically extending truss-like members 18, each of which comprises elongated vertically extending members 20 interconnected by a plurality of cross pieces 22 and angularly extending reinforcing members 24 to rigidify the truss-like members 18. The latter in turn are interconnected by suitably located horizontally extending frame members certain of which are shown at 26. There should be a sufficient number of these horizontally extending frame members and they should be properly distributed to form a structure rigid and sturdy enough to support the concentrator 10 in high wind or other inclement weather.

Fixedly anchored to this upright framework is a spherically concave framework for supporting the mirrors 12 which framework may be of grid-like construction. A framework suitable for this purpose would include a plurality of generally vertically extending members made from a relatively heavy structural steel strap-like stock and having an end-to-end length approximating the height of the concentrator. One of these frame members is shown at 28 in FIGS. 2 and 4 from which it will be noted that it is spherically concave in an end-to-end direction. These vertical frame members or ribs are rigidly anchored to the upright supporting framework 14 previously described in any suitable manner, for example, by rigidly anchoring the same to the horizontal frame members 26 in the upright supporting framework. Rigidly anchored to these vertically extending spherically concave ribs 28 is a plurality of horizontally extending rails 30 similar in construction to the vertically extending ribs 28, the radius of curvature of these rails being the same as that of the vertical ribs. There are two of these horizontal rails for each of the horizontally extending rows of mirrows 12 in the concentrator as indicated diagrammatically in FIG. 2, and they are spaced from each other to provide a rigid base for anchoring the mirrors to the upright framework 14 in horizontally and vertically aligned rows as shown in FIG. 1.

The individual mirrors 12 which are of duplicate construction are concavely spherical with respect to the source of parallel rays as shown on an exaggerated scale in FIG. 1 so that each is a focusing mirror, the concavity being such that the effective focal length of the mirrors is relatively long. These mirrors are anchored to the spherically concave grid-like framework just described by a three-point mounting 32 (FIGS. 3 and 4), each leg 34 of which has a universal joint 36 therein to permit the individual mirrors 12 to be individually adjusted. The adjustable three-point mounting structure 32 for each of the mirrors 12 includes a rigid metal anchor ring 38 of slightly smaller diameter than the length of a side of the mirror 12. Each of the mirrors 12 is rigidly anchored to one of these rings 38 by three cap screws 40 spaced angularly at equal distances from each other around the ring 38. These screws pass through apertures in the mirror 12, each of which is provided with cushioning means 42 of such shape and material that the mirror is cushioned from both the head and shank of the screws 40 and from the anchor ring 38 when the screws are tightened into the ring, but yet the mirror and ring are rigidly secured together. The threaded end of each of these screws 40 provides an anchor for a knuckle 44 forming part of the universal joint 36 previously mentioned. These knuckles have a stem 46 (FIG. 5) threaded or otherwise suitably fixed in the back side of the anchor ring 38 so as to maintain the pivot axis thereof in a predetermined position as indicated in FIG. 4. The cap screws 40 may be threaded into these stems to thus anchor the three elements together.

Each of the three legs 34 of the universally adjustable mirror mounting structure also includes an elongated pin 48 threaded adjacent one end thereof as indicated at 50 in FIG. 4 and having a knuckle 52 rigidly fixed to the other end thereof. Knuckles 52 and 44 are hingedly connected to form a universal mounting heretofore designated 36 by a link 54 hinged to the ring knuckle 44 by a pin 56 and to the pin knuckle 52 by a pin 58. This link has a 90° twist intermediate its ends to maintain the axis of the two pins 56 and 58 in planes approximately 90° angularly displaced. The threaded ends of the mounting pins 48 pass through apertures in the horizontally extending rails 30 of the grid-like framework and may be locked at various positions of endwise adjustment relative to the rails 30 by lock nuts 60 and 62 threaded on the same on opposite sides of the rail 30. It will be understood that the adjustable three-point mounting thus provided permits universal adjustment of the mirror 12 supported thereby by adjustment of the lock nuts 60 and 62 and that the mirror is rigidly locked at a position of adjustment when these lock nuts are tightened against the horizontal rails 30. It will also be understood that the universally adjustable three-point mounting disclosed herein is merely exemplary and that other forms of universally adjustable mounting means could be used for mounting the individual mirrors.

In order to obtain maximum concentration of solar rays, and to reduce aberration to a minimum, it has been found that the individual mirrors 12 should be so mounted in an array of the type shown in FIG. 1 that the centers of the individual mirrors all lie on an imaginary spherical surface having a radius of curvature equal to half of the radius of curvature of the individual mirrors. The three-point mounting 32 of the individual mirrors 12 above described along with the spherically concave curvature of the grid-like framework also described above which carries the three-point mountings permit this effect to be obtained. This, of course, requires that the radius of curvature of the grid-like framework be approximately one-half the radius of curvature of the individual mirrors. Additional adjustment of the individual mirrors to accommodate for irregularities in the frame or mirrors or to the fact that the mirrors are located at varying distances from the center or axis of the concentrator may be made by adjusting the three-point mountings 32 of these mirrors so that the images produced by all of the mirrors may be made to superpose at a predetermined focus or field.

To illustrate the application of the principles of the invention, a practical embodiment of a concentrator will be described which comprises an array substantially square in peripheral outline having 14 mirrors on a side as shown more or less diagrammatically in FIG. 1. Each of the mirrors 12 in this embodiment is two-feet square in peripheral outline and is made of quarter-inch plate glass slumped to spherical concavity over a mold and ground and polished if necessary to form a spherically concave forwardly facing side as indicated on an exaggerated scale in FIG. 1. These mirrors preferably are aluminumized to provide an efficient reflecting surface and this surface preferably is protected by silicon monoxide. Because the mirrors are of duplicate construction, fabrication of the same is facilitated. As shown in FIG. 1, there is an 8 x 8 foot space in the center of the concentrator free of mirrors because the test chamber shades parallel rays from the heliostat over this area so that the concentrator includes a total of 180 individual mirrors.

By means of the previously described three-point universal mounting 32, the mirrors 12 are mounted on a spherically concave grid-like framework of the type previously described. This framework has a radius of curvature of approximately 35.8 feet, and the radius of curvature of the individual mirrors is 71.6 feet. By the proper adjustment of the three-point universal mounting 32 of the individual mirrors 12 in this array, parallel solar rays from a heliostat indicated diagrammatically by the parallel lines 64 in FIG. 2 striking the 180 individual mirrors 12 will all be focused or concentrated at a predetermined field 66 on the axis of the concentrator at a distance 35.8 feet forward of its mid-point as indicated by the converging lines 68 in the same view. The images of the sun produced by the individual mirrors 12 are, therefore, superposed at this focal point or field which is vertical, and, in the example here described, would be approximately 4 inches in diameter. Assuming a concentrator constructed as described above is 50% efficient, an average of eighty-two calories per square centimeter per second could be obtained at the center of a uniform image field.

The superior optical performance of the concentrator above-described will be apparent to those skilled in the art from the following brief explanation:

Instead of considering the concentrator as a single reflecting surface, it may be viewed as an arrangement of individually focusing spherical mirrors. A mirror placed in the on-axis position, or at the center of the array, must focus at $$f = \frac{d}{\alpha}$$

where $d$ is the image diameter and $\alpha$ is the angle subtended by the sun. In the present case, $d=4$ inches and $\alpha$ is .00931 radian, which gives $f=429.6$ inches (35.8 feet). The radius of curvature of a spherical mirror is twice its focal length, or 859.2 inches.

Actually, there is no mirror at the center of the array; all of the mirrors are operated off-axis, since all of them are required to produce a solar image at a point on the axis of the array 35.8 feet from its center. In devising a surface which will make this possible for all mirrors, a first approximation to such a surface is obtained by a consideration of the third order aberrations which apply to a spherical mirror. From an object at infinity (i.e. the sun) the image distance due to spherical aberration for an extreme ray parallel to the axis is $$a = -\frac{R}{\left(2 + \frac{h^2}{R^2}\right)}$$

where R is the radius of curvature and $h$ is the distance from the axis where the ray is incident. For a square mirror, 24 inches on a side, the maximum value of $h$ is $12\sqrt{2}$, or about 17 inches. The value of R is 859.2, so that $$a = -\frac{859.2}{\left[2 + \frac{(17)^2}{(859.2)^2}\right]}$$

$$= -\frac{859.2}{[2.0004]} = -429.5 \text{ inches}$$

Thus, the image from the extreme rays is formed 0.1 inch closer to the mirror than that from axial rays. As will be seen, this aberration is quite small.

The coma produced in the solar image due to the lack of uniformity in lateral magnification by this mirror can be shown to be quite small. Third order theory for a mirror results in the following formula for the radius of the comatic circle:

$$r_c = \frac{3yh^2}{4f^3}$$

where $y$ is the distance of the image from the mirror axis. For our extreme mirror, i.e., a corner of the array, $y$ is about 110 inches, and as before, $h=17$ inches, $f=429.6$ inches.

Thus $$r_c = \frac{3}{4} \frac{(110)(17)^2}{(429.6)^3}$$

$$= 0.0003 \text{ inch}$$

The tangential coma is $3r_c$, or about .001 inch, so that the image of a point source at infinity would become a circle of diameter .0006 inch, with a .001 inch "tail" extending to the true image position. Such an aberration is completely negligible in the present case.

Next, the principal aberration due to the off-axis operation of the mirrors must be calculated. This effect is known as astigmatism. A point source at infinity which is not on the axis of the mirror will produce two line images which are not at the same point in space. These lines are perpendicular to one another, and are separated by a distance which depends upon the angle which the incoming beam makes with the axis. The tangential, or primary, focus for a spherical mirror is formed at a distance $$a_t = \frac{R \cos \beta}{2}$$

from the center of the mirror, where $\beta$ is the angle which the incoming beam makes with the principal axis. The sagittal, or secondary, focus is formed at $$a_s = \frac{R}{2 \cos \beta}$$

In the present case, the maximum value of the angle $\beta$ is about 15°, so that $$a_t = \frac{(859.2)(.966)}{2}$$

$$= 415.0 \text{ inches}$$

and $$a_s = \frac{(859.2)}{2(.966)}$$

$$= 444.7 \text{ inches}$$

The maximum astigmatic difference is $(a_s - a_t)$, or 29.7 inches. The best image is difficult to define for a system suffering from astigmatism; the loci of the mean positions form a nearly spherical surface about the mirror center. In the present case, at $\beta = 15°$, the mean position is at 429.8 inches from the center; this differs by only 0.2 inch from $R/2$. A "mean focus" is the position where the image of a point source is spread out into a minimum illuminated area which has the approximate outline of the mirror itself. In the present case, this is nearly a square; if the image is formed on a vertical plane, as in the system under study, the square image becomes a trapezoid.

The other classical aberrations, distortion, and curvature of the field, need not be considered, since the sun as an object has such a small lateral extent. Also, a mirror is not subject to chromatic aberration.

In summary, each individual mirror forms an image which is subject to two aberrations of consequence. As a result of spherical aberration, a mirror of the dimensions herein specified would form a mean image between 429.5 inches and 429.6 inches from the mirror center, if used on-axis. The operation of the same mirror 15° off-axis produces a "mean" image at about 429.8 inches, also measured from the mirror center. The astigmatic difference is quite large, however, so that significant changes in image size would be detected only by moving several inches away from the mean position.

Since these estimates of mean image position were calculated using only the results of third-order aberration theory, higher order aberrations were considered and also use was made of more exact methods. The outermost mirror, according to the results of these methods, would need to be advanced from a spherical surface in the direction of the incoming beam less than 2 inches; such a correction can easily be made in adjustment of the mirror on the array. Using ray tracing, the best image is calculated by obtaining the spread of an image of a point source in the vertical plane, and minimizing the area. In third-order theory, it was merely assumed that the best image occurred at the mean between the astigmatic images, and the deviation from a spherical surface was found to be negligible.

These optical considerations yielded a result which defined a design criterion. If the best image position for each mirror is aproximately at $R/2$, then the centers of all mirrors must lie on a surface which is part of a spheroid of radius $R/2$. The slope of the spheroidal surface is not coincident with the slope of the mirror, since its purpose is only to position the mirror for best imaging.

From the above description of the invention, it will be observed that the use of individual focusing mirrors permits use of mirrors of a longer effective focal length and a smaller angle of convergence, and reduces the number of individual mirrors needed as compared to other multiple mirror concentrators.

While a preferred embodiment of the invention has been shown and described, it will be apparent that variations and modifications thereof may be made without departing from the underlying principles of the invention. It is desired, therefore, by the following claims, to include within the scope of the invention, all such variations and modifications by which substantially the results of the invention may be obtained through the use of substantially the same or equivalent means.

We claim:

1. A multiple mirror solar ray concentrator comprising a spherically concave mirror supporting frame, a plurality of substantially duplicate spherically concave mirrors, and means for mounting said plurality of mirrors in a predetermined array upon said frame including adjustable means effective conjointly with the spherical concavity of said frame to permit individual adjustment of said mirrors sufficient to locate the centers of concavity of all of the said mirrors on a common imaginary spherical surface having a radius of curvature bearing a predetermined relation to the radius of curvature of said individual mirrors.

2. A multiple mirror solar ray concentrator comprising a spherically concave mirror supporting frame, a plurality of substantially duplicate spherically concave mirrors, and means for mounting said plurality of mirrors in a predetermined array upon said frame including adjustable means effective conjointly with the spherical concavity of said frame to permit individual adjustment of said mirrors sufficient to locate the centers of concavity of all of said mirrors on a common imaginary spherical surface having a radius of curvature approximately one-half the radius of curvature of said individual mirrors.

3. A multiple mirror solar ray concentrator comprising a spherically concave mirror supporting frame of relatively large peripheral dimensions, a plurality of substantially duplicate spherically concave mirrors, the radius of curvature of said frame being a predetermined fraction of the radius of curvature of said mirrors and the peripheral dimensions of said mirrors being small relative to the peripheral dimensions of said frame and means for mounting said plurality of mirrors on said frame in vertically and horizontally aligned rows closely spaced from each other including adjustable means having a range of adjustment effective conjointly with the spherical concavity of said frame to permit individual adjustment of the said mirrors sufficient to locate the center of concavity of all of the said mirrors on a common imaginary spherical surface having a radius of curvature a predetermined fraction of the radius of curvature of said mirrors.

4. A multiple mirror solar ray concentrator as defined in claim 3 wherein the individual mirrors are approximately square in peripheral outline and there is an equal number of individual mirrors in the vertical and horizontal rows in said array substantially equally spaced from each other so that the peripheral outline of said array is substantially square.

5. A multiple mirror solar ray concentrator comprising a spherically concave mirror supporting frame defining a fragment of a spherical surface, means for fixedly supporting said frame to dispose the radius through the center of curvature of said frame in a horizontal plane, a plurality of spherically concave focusing mirrors all of substantially the same focal length, the radius of curvature of said frame being approximately one-half of the radius of curvature of said mirrors and means for mounting said plurality of mirrors in a predetermined array on said frame including means for individually adjusting the said mirrors to locate the centers of concavity of all of said mirrors on a common imaginary spherical surface having a radius of curvature approximately one-half the radius of curvature of the individual mirrors.

References Cited in the file of this patent

UNITED STATES PATENTS

| | | |
|---|---|---|
| 514,669 | Allingham | Feb. 13, 1894 |
| 683,088 | Wideen | Sept. 24, 1901 |
| 797,891 | Himalaya | Aug. 22, 1905 |
| 811,274 | Carter | Jan. 30, 1906 |
| 951,850 | Skilling | Mar. 15, 1910 |
| 1,248,456 | Clark | Dec. 4, 1917 |
| 1,367,472 | Harvey | Feb. 1, 1921 |
| 1,386,781 | Harvey | Aug. 9, 1921 |
| 1,479,923 | Moreau | Jan. 8, 1924 |
| 2,471,954 | Harvey | May 31, 1949 |

FOREIGN PATENTS

| | | |
|---|---|---|
| 493,424 | Italy | Apr. 26, 1954 |
| 1,035,832 | France | Apr. 22, 1953 |